Aug. 24, 1965  W. F. LAWLER  3,202,053
POLARIZING FILTER HOLDERS FOR INVERTED MICROSCOPES
Original Filed June 21, 1961  2 Sheets—Sheet 1

WILLIAM F. LAWLER
INVENTOR

BY Frank C. Parker
ATTORNEY

WILLIAM F. LAWLER
INVENTOR

ATTORNEY

United States Patent Office 3,202,053
Patented Aug. 24, 1965

3,202,053
POLARIZING FILTER HOLDERS FOR INVERTED MICROSCOPES
William F. Lawler, Rochester, N.Y., assignor to Bausch & Lomb Incorporated, Rochester, N.Y., a corporation of New York
Original application June 21, 1961, Ser. No. 118,567. Divided and this application Oct. 26, 1964, Ser. No. 406,342
1 Claim. (Cl. 88—65)

This application is a division of my pending application Serial No. 118,567, filed June 21, 1961.

This invention relates to microscopes and more particularly relates to improvements in filter holders for the inverted type of microscopes.

It is an object of the present invention to provide such a microscope device which is easy to use and adjust, which is sturdy in construction, is easy to maintain in clean condition and has good appearance.

Another object of this invention is to provide such an instrument having means for performing critical operations involving such features as the use of polarizers and filters.

Further objects and advantages will be apparent in the form and arrangement of the parts and in the details of construction thereof by reference to the specification hereinbelow taken in connection with the accompanying drawings, wherein.

Figure 1:
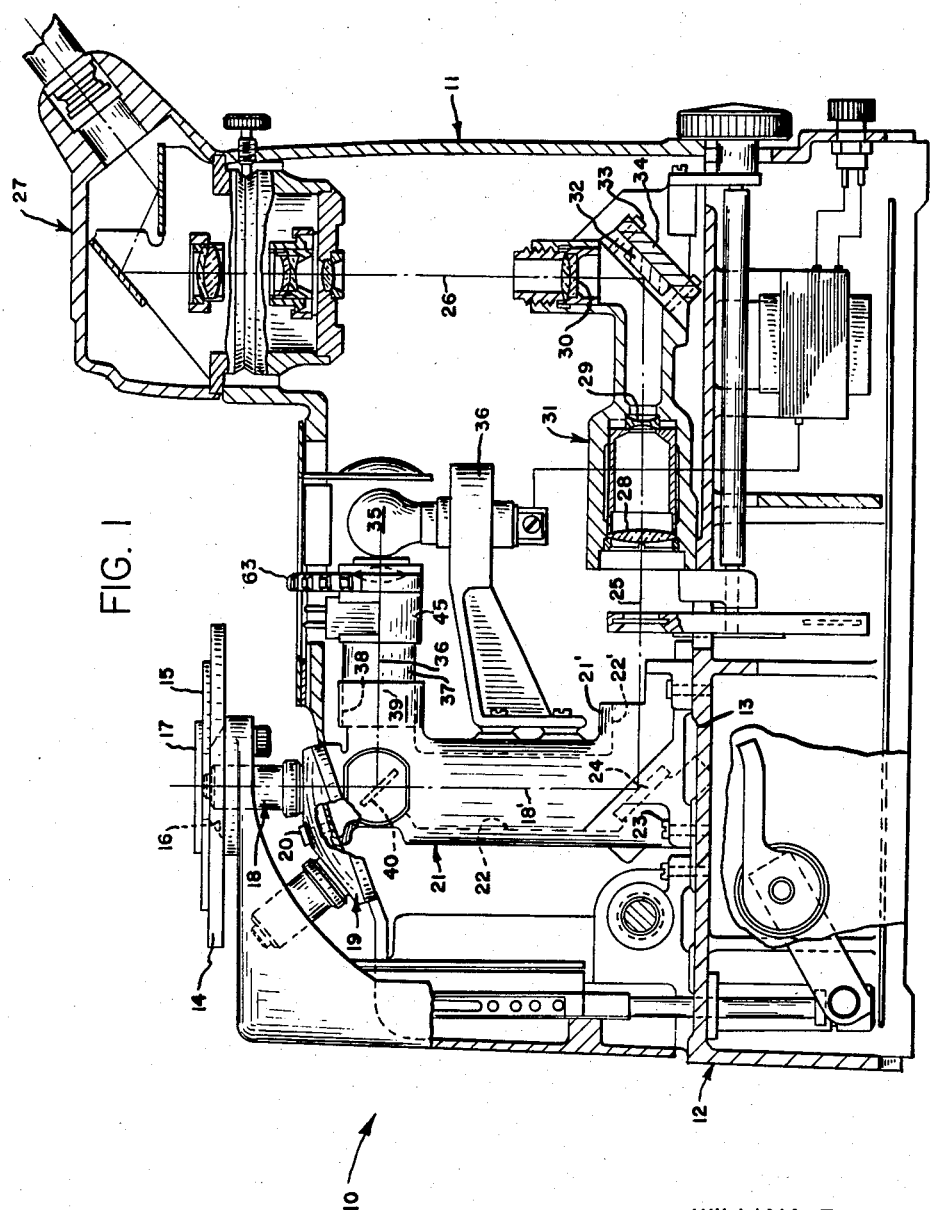
FIG. 1 is a general elevational view of a preferred form of inverted microscope constructed according to the present invention.

With reference to FIG. 1 of the drawing, the numeral 10 designates generally an inverted microscope comprising a housing 11 having a base portion 12 wherein is formed in any suitable manner a shelf 13. As best seen in FIG. 1, the base portion 12 of the housing 11 is rectangular in shape and the upper portions of the housing are of the same rectangular shape generally.

A stage plate 14 having a horizontal working surface 15 is substantially entirely positioned over one end of the housing 11, said stage plate having an aperture 16 therethrough over which an object 17 is held for observation. Partially positioned within the stage aperture 16, one objective 18 of a plurality of objectives is positioned so as to focus on the object 17. Said objective 18 is held in a turret 19 which is pivotally mounted in a protected location underneath the stage 14. The rotatable turret 19 is pivotally mounted by means of the pivot screw 20 on the top portion of an upright frame member 21 wherein the screw is threaded. The upright frame member 21 is provided with a vertical sight opening 22 therethrough and said member is secured onto the horizontal shelf 13 in any preferred manner such as by the screws 23 which extend through suitable clearance holes in the base of the frame member 21 and are threaded into the shelf.

The optical path within the microscope is folded into an upright U-shape wherein the axis 18' of the objective 18 is in fact one of the upright portions of said optical path. A side opening 22' at the base of the frame member 21 extends horizontally through a lateral portion 21' of the frame member from the opening 22 to the outside thereof. At the intersection of openings 22 and 22', an inclined mirror 24 is fixed in any suitable manner so as to deflect the line of sight along a horizontal portion 25 of said optical path.

On an opposite upright portion 26 of the optical path, an ocular member 27 is aligned and between the mirror 24 and ocular member a relay lens system consisting of the lenses 28, 29 and 30 is positioned partly on the horizontal part 25 of the optical path for relaying the image formed by the objective along the optical path to the ocular member.

A combination lens and mirror mount 31 is provided for holding the lenses 28, 29 and 30 in optical alignment with a second inclined mirror 32 which is fixed between lenses 29 and 30 on an inclined seat 33 so as to deflect the image rays vertically along the second vertical axis 26 of the U-shape optical path. The unitary mount 31 advantageously holds optical members 28, 29, 30 and 32 in good optical alignment with each other. Adjustably attached to the corner portion of the mount 31 in any desired manner such as the adjustable studs 33 is an inclined plate 34 whereon the mirror 32 is secured by any suitable means.

Further emphasizing compactness of design of the inverted microscope 10, a light source in the form of a lamp 35 is mounted on an independent bracket 36 which extends laterally from and is secured to the upright objective frame member 21 within housing 11. Aligned with lamp 35 on a horizontal axis 36 is a mounting sleeve 37 which is fitted into an opening 38 in a boss 39 which projects laterally from the top of the hollow frame member 21. The short horizontal axis 36 intersects the vertical objective axis 18, and coincident with the point of intersection a semi-reflective inclined mirror 40 is fixed within said frame member 21, the angle of inclination of the mirror being such as to direct illumination episcopically upon said object through the objective 18.

Figure 2:
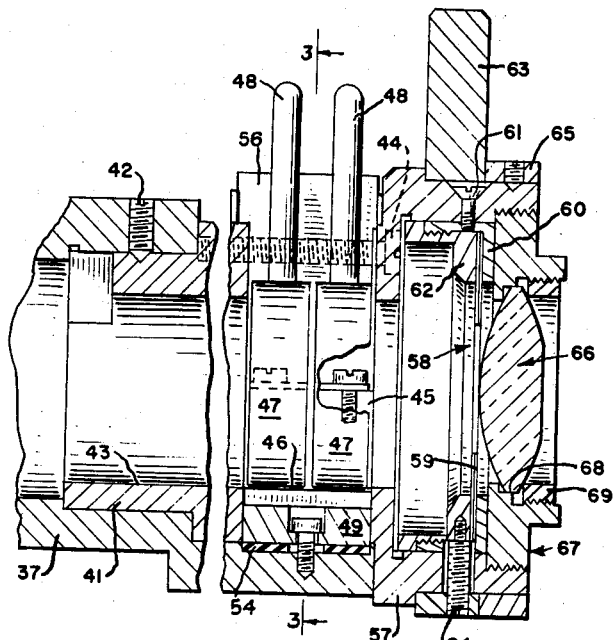
FIG. 2 is an enlarged axial sectional view partly broken away showing parts of the illumination system.

In the end of the mounting sleeve 37 nearest to the lamp 35, a bushing 41 is fitted and is secured therein by any desired means such as the screws 42, as shown in FIG. 2. Said bushing 41 is provided with a bore 43 concentric with the short horizontal axis 36.

Figure 3:
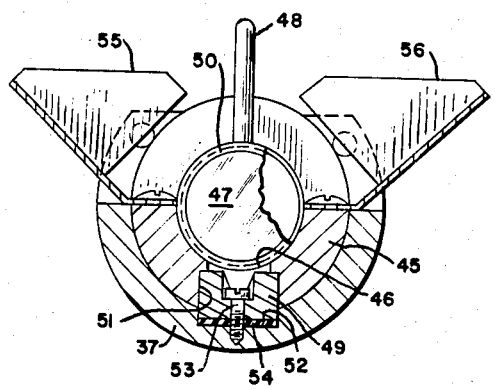
FIG. 3 is a cross-sectional view taken substantially on the line 3—3 of FIG. 2.

Secured to the end face of the bushing 41 in any preferred manner such as the screws 44, is a cell mounting sleeve 45. Said sleeve 45 is provided internally with a semi-cylindrical seating surface 46 whereon one or more optical cells 47 containing polarizers or filters are held in alignment on the horizontal axis 36. The upper half of the sleeve 45 is removed above the cells 47 as best shown in FIG. 3 so that the optical cells may be inserted easily from the top onto the seating surface 46 by the use of the handles 48. This construction permits the rotation of the cells 47 on the seating surfaces 46 through nearly 180° which is particularly advantageous for polarizing cells.

The prime novel feature of the present invention which is particularly useful in a portable instrument is the provision of magnetic means for holding the polarizer cells 47 on the seating surface 46 in any desired angular position reliably without the use of superposed mechanism such as clamps and springs clips. Said magnetic means comprises a magnet 49 and magnetizable cell frame 50 as shown in FIG. 3, the magnet being contained within a recess 51 in the lower side of the sleeve 45. A magnet supporting surface 52 is formed in the lower part of mounting sleeve 37 and the magnet 49 is retained thereon by means of a cap screw 53 which extends through a clearance hole in the magnet and is threaed into said mounting sleeve.

Normally the magnet 49 is so located that no part thereof touches the cell frames 50 whereby the cells are not seized by the magnet. Furthermore, means are provided for adjusting the effective magnetic force of the magnet 49 comprising a soft rubber or other yielding member 54 which is interposed between the magnet supporting surface 52 and the bottom surface of the magnet, so that by adjustment of the screw 53 a change of effective magnetic force on the cells is effected.

As seen in FIG. 3, the side chutes 55 and 56 are provided to serve as guides when inserting the cells 47 in operative position on the seating surface 46 and also to prevent the cells from dropping into the clearance space around said surface.

Attached to the mounting sleeve 37 by the screws 44 is an annular casing 57 positioned adjacent to the cell mounting sleeve 45, said casing being constructed to operably position a variable diaphragm mechanism generally indicated by numeral 58 therein. Said mechanism 58 comprises a set of diaphragm blades 59 which are attached pivotally by means, not shown, at one end to a stationary ring 60 which is fixed in the casing 57 by screws 61. The other ends of the diaphragm blades 59 are pivotally secured by means, not shown, to an operating ring 62 which is rotatably mounted within the casing 57 and is rotated by a manual control ring 63 which is rotatably journaled on the outer diameter of the casing by means of a connecting screw 64 which is threaded into the manual control ring and extends through an angularly elongated slot formed in casing 57. A stop collar 65 fixed to the casing 57 is provided to retain the control ring 63 in assembled position.

Within the casing 57 and aligned on the horizontal axis 36, a condenser lens 66 is provided as shown in FIG. 2 for condensing the light coming from the aligned lamp 35. For mounting the lens 66, an annular lens holder 67 having a lens seat 68 formed therein whereon the lens is located is provided, said lens being held thereon by a clamp ring 69 which is threaded into said holder so as to bear against the lens.

Certain advantages are worthy of reemphasis, these being, (a) the use of magnetic means for holding the polarizer and/or filter cells in operative position, and
(b) the easy access of the controls for the aforementioned cells.

Although only certain forms of this invention have been shown and described in detail, other forms are possible and changes may be made in the arrangement and construction of the details thereof without departing from the spirit of the invention as defined in the claim appended herebelow.

I claim:

A mounting for a polarizing element comprising a polarizer holding cell formed from magnetizable material and having an arcuate peripheral surface, a cell mounting sleeve having a central opening therethrough for the passage of a beam of light, a semi-cylindrical seating surface conforming substantially to said peripheral surface in shape and being formed in said sleeve approximately concentrically with said opening so as to form a socket wherein said cell rests with freedom for relative rotative movement therebetween, a pair of surfaces formed in said sleeve normal to said opening and spaced apart a distance greater than the thickness of said cell and a second pair of longitudinal surfaces formed substantially coplanar with the axis of said sleeve and connecting the opposite ends of the radial surfaces together so as to define a radial open slot in said sleeve overlying said seating surface, a cell handle fixed radially to said cell and projecting through said slot whereby said cell may be rotated on said seating surface, a magnet positioned below the lowest part of said socket and free of said cell, a magnet supporting surface located in spaced relation to the underside of said magnet, a magnet retaining screw abutting against and extending through an opening in said magnet and threaded into the member on which said supporting surface is formed, and an elastic member occupying the space between the bottom of the magnet and its supporting surface, said screw being adjusted to draw the magnet away from the cell and change the effective magnetic retentive force tending to retain the cell in its socket.

References Cited by the Examiner

UNITED STATES PATENTS

| 1,995,599 | 3/35 | Bauersfeld | 88—40 |
| 2,471,879 | 5/49 | Lowber et al. | 88—40 X |
| 3,062,100 | 11/62 | Ludewig et al. | 88—32 |

FOREIGN PATENTS

| 430,826 | 6/25 | Great Britain. |

DAVID H. RUBIN, *Primary Examiner.*